United States Patent
Zhang et al.

(10) Patent No.: US 12,101,228 B2
(45) Date of Patent: Sep. 24, 2024

(54) BACKHAUL METHOD, UNIT, DATA ALLOCATION METHOD AND CONTROLLER, NETWORK SYSTEM, AND MEDIUM

(71) Applicant: ZTE CORPORATION, Shenzhen (CN)

(72) Inventors: Diqiang Zhang, Shenzhen (CN); Kai Liu, Shenzhen (CN); Zhuyuan Liu, Shenzhen (CN); Wenbin Zhou, Shenzhen (CN); Chao Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 10 days.

(21) Appl. No.: 17/779,970

(22) PCT Filed: Nov. 26, 2020

(86) PCT No.: PCT/CN2020/131890
§ 371 (c)(1),
(2) Date: May 25, 2022

(87) PCT Pub. No.: WO2021/104392
PCT Pub. Date: Jun. 3, 2021

(65) Prior Publication Data
US 2022/0417104 A1    Dec. 29, 2022

(30) Foreign Application Priority Data
Nov. 26, 2019   (CN) .................. 201911173853.4

(51) Int. Cl.
*H04L 41/12*       (2022.01)
*H04B 10/2575*    (2013.01)
*H04W 56/00*       (2009.01)

(52) U.S. Cl.
CPC ....... *H04L 41/12* (2013.01); *H04B 10/25756* (2013.01); *H04W 56/001* (2013.01)

(58) Field of Classification Search
CPC ............. H04L 41/12; H04B 10/25756; H04W 56/001; H04W 24/04; H04W 88/085
See application file for complete search history.

(56) References Cited

U.S. PATENT DOCUMENTS

| | | | |
|---|---|---|---|
| 7,181,141 B1 * | 2/2007 | Kapur | ................. H04L 43/0811 398/58 |
| 10,945,226 B2 * | 3/2021 | Abedini | .................. H04L 45/04 |

(Continued)

FOREIGN PATENT DOCUMENTS

| | | |
|---|---|---|
| CN | 1728609 A | 2/2006 |
| CN | 101834663 A | 9/2010 |

(Continued)

OTHER PUBLICATIONS

International Search Report for Application No. PCT/CN2020/131890, dated Feb. 10, 2021, 6 pages including English translation.

(Continued)

*Primary Examiner* — Tonia L Dollinger
*Assistant Examiner* — Joseph M Cousins
(74) *Attorney, Agent, or Firm* — Morgan, Lewis & Bockius LLP

(57) ABSTRACT

Provided is an information backhaul method, which is applied to a networking unit in a network system. The network system includes multiple stages of networking units that are cascaded, and each of the multiple stages of networking units includes multiple optical ports. The information backhaul method includes: acquiring cascade information of a networking unit in a current stage, where the cascade information of the networking unit in the current stage includes optical port information and identification (Continued)

information of the networking unit in the current stage; and feeding back the cascade information of the networking unit in the current stage. Further provided are a data allocation method, a networking unit, a data allocation controller, a network system and a computer-readable storage medium.

13 Claims, 10 Drawing Sheets

(56) References Cited

U.S. PATENT DOCUMENTS

| | | | | |
|---|---|---|---|---|
| 2017/0048726 | A1* | 2/2017 | Zhang | H04W 88/08 |
| 2017/0311183 | A1 | 10/2017 | Cotanis | |
| 2018/0048546 | A1* | 2/2018 | Coccoli | H04L 69/40 |
| 2020/0184784 | A1* | 6/2020 | Sainath | G08B 5/22 |

FOREIGN PATENT DOCUMENTS

| | | | |
|---|---|---|---|
| CN | 102611493 | A | 7/2012 |
| CN | 102802181 | A * | 11/2012 |
| CN | 103209185 | A | 7/2013 |
| CN | 103795573 | A * | 5/2014 |
| CN | 107612714 | A | 1/2018 |
| CN | 108768507 | A | 11/2018 |
| CN | 112954721 | A | 6/2021 |
| EP | 2495912 | A1 | 9/2012 |
| EP | 3280102 | A1 | 2/2018 |
| WO | WO-2009067859 | A1 | 4/2009 |
| WO | WO-2012100372 | A1 | 8/2012 |
| WO | WO-2016062154 | A1 | 4/2016 |

OTHER PUBLICATIONS

Extended European Search Report for Application No. 20892445.6, dated Nov. 23, 2023, 18 pages.
Chia-Yu Chang et al: "5G Programmable Infrastructure Converging disaggregated network and compute REsources", 5G-Picture project, Apr. 4, 2018 (Apr. 4, 2018), XP055738480, Retrieved from the Internet: URL:https://www.5g-picture-project.eu/download/5g-picture_d41.pdf [retrieved on Oct. 9, 2020].

* cited by examiner

BACKHAUL METHOD, UNIT, DATA ALLOCATION METHOD AND CONTROLLER, NETWORK SYSTEM, AND MEDIUM

CROSS-REFERENCE TO RELATED APPLICATIONS

This is a National Stage Application filed under 35 U.S.C. 371 based on International Patent Application No. PCT/CN2020/131890, filed on Nov. 26, 2020, which claims priority to Chinese Patent Application No. 201911173853.4, filed on Nov. 26, 2019, disclosures of both of which are incorporated herein by reference in their entireties.

TECHNICAL FIELD

The present application relates to the technical field of communication, for example, an information backhaul method, a data allocation method, a networking unit, a data allocation controller, a network system and a computer-readable storage medium.

BACKGROUND

With the rapid development of wireless communication, 5G technology has been applied accordingly. A single fiber cannot meet a customer's requirement for fiber bandwidth resources. To avoid this, a 100G optical module is developed.

However, the 100G optical module costs too much, and the requirement for the fiber bandwidth resources does not urgently require that the 100G optical module be used.

In view of the above, a cascaded indoor distribution system is further developed. The indoor distribution system includes a baseband unit (BBU), multiple radio remote units (RRUs) and multiple BBU bridge devices, where each BBU bridge device corresponds to at least one RRU, the multiple BBU bridge devices are cascaded, and a BBU bridge device in a last stage is connected to the BBU.

Two adjacent stages of BBU bridge devices are cascaded in a mode of two-fiber cascade. Due to a relatively large number of ports and fibers involved, a fiber may be plugged reversely or fibers in pairs may be plugged incorrectly. Once the above situation occurs, a user cannot communicate normally, and user experience is reduced.

Therefore, how to avoid that the fibers between two adjacent stages of BBU bridge devices are plugged incorrectly or reversely in the above mode of two-fiber cascade becomes a technical problem to be solved urgently in the field.

SUMMARY

The present disclosure provides an information backhaul method, a data allocation method, a networking unit, a data allocation controller, a network system and a computer-readable storage medium, so as to avoid at least one of the above situations.

In a first aspect of the present disclosure, an information backhaul method is provided, which is applied to a networking unit in a network system. The network system includes multiple stages of networking units that are cascaded, and each of the multiple stages of networking units includes multiple optical ports. The information backhaul method includes: acquiring cascade information of a networking unit in a current stage, where the cascade information of the networking unit in the current stage includes optical port information and identification information of the networking unit in the current stage; and feeding back the cascade information of the networking unit in the current stage.

In a second aspect of the present disclosure, a data allocation method is provided. The data allocation method includes: determining an actual networking topology according to cascade information of multiple stages of networking units, where cascade information of each of the multiple stages of networking units includes optical port information of the each of the multiple stages of networking units and identification information of the each of the multiple stages of networking units; determining a data allocation link according to the actual networking topology; and allocating data according to the data allocation link.

In a third aspect of the present disclosure, a networking unit is provided. The networking unit is applied to each of multiple stages of networking units in a network system and includes multiple optical ports, a cascade information acquisition module and a backhaul module.

The cascade information acquisition module is configured to acquire cascade information of a networking unit in a current stage. The cascade information of the networking unit in the current stage includes optical port information and identification information of the networking unit in the current stage. The backhaul module is configured to feed back the cascade information of the networking unit in the current stage.

In a fourth aspect of the present disclosure, a networking unit is provided. The networking unit includes a memory storing an executable program and at least one processor. When the at least one processor calls the executable program, the at least one processor can perform the preceding data backhaul method according to the present disclosure.

In a fifth aspect of the present disclosure, a data allocation controller is provided. The data allocation controller includes an actual networking topology generation module, a data allocation link determination module and a data allocation module. The actual networking topology generation module is configured to determine an actual networking topology according to cascade information of multiple stages of networking units. Cascade information of each of the multiple stages of networking units includes optical port information and identification information of the each of the multiple stages of networking units. The data allocation link determination module is configured to determine a data allocation link according to the actual networking topology. The data allocation module is configured to allocate data according to the data allocation link.

In a sixth aspect of the present disclosure, a data allocation controller is provided. The data allocation controller includes a memory storing an executable program and at least one processor. When the at least one processor calls the executable program, the at least one processor can implement the preceding data allocation method according to the present disclosure.

In a seventh aspect of the present disclosure, a network system is provided. The network system includes a data allocation controller, a BBU, multiple RRUs and multiple stages of networking units that are cascaded, where each of the multiple stages of networking units is the preceding networking unit according to the present disclosure, the data allocation controller is the preceding data allocation controller according to the present disclosure, a networking unit in a last stage communicates with the BBU, and each of the multiple stages of networking units corresponds to at least one of the multiple RRUs.

In an eighth aspect of the present disclosure, a computer-readable storage medium storing an executable program is provided, where the executable program, when executed, can implement the preceding information backhaul method according to the present disclosure.

In a ninth aspect of the present disclosure, a computer-readable storage medium storing an executable program is provided, where the executable program, when executed, can implement the preceding data allocation method according to the present disclosure.

DETAILED DESCRIPTION

As an aspect of the present disclosure, an information backhaul method is provided, which is applied to a networking unit in a network system. The network system includes multiple stages of networking units that are cascaded. Each of the multiple stages of networking units includes multiple optical ports, each of the multiple optical ports includes a transmitting optical port and a receiving optical port, and any two adjacent stages of networking units are cascaded through optical ports.

Figure 1:
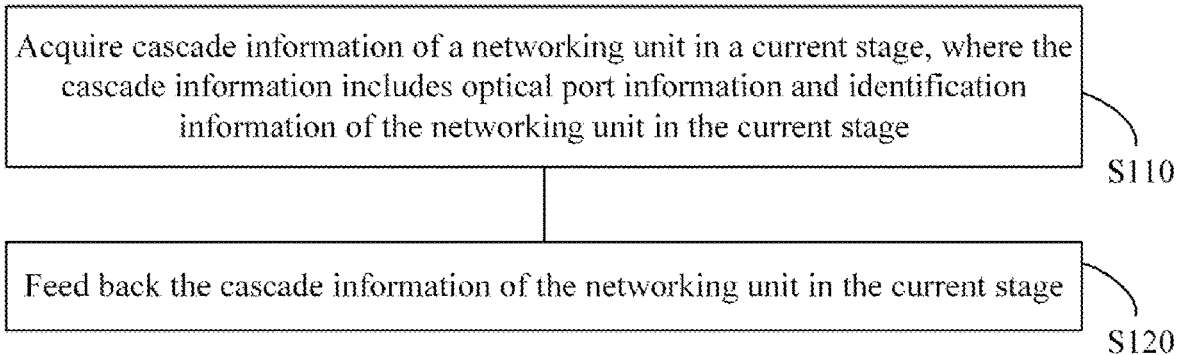
FIG. 1 is a flowchart of an information backhaul method according to the present disclosure.

As shown in FIG. 1, the information backhaul method according to the present disclosure includes steps S110 to S120.

In step S110, cascade information of a networking unit in a current stage is acquired. The cascade information includes optical port information and identification information of the networking unit in the current stage.

In step S120, the cascade information of the networking unit in the current stage is fed back. The identification information of the networking unit in the current stage includes a device number of a device corresponding to the networking unit in the current stage and is used for identifying the networking unit in the current stage.

It is to be noted that the information backhaul method is performed by any one of the multiple stages of networking units. In the information backhaul method according to the present disclosure, the information fed back includes the optical port information and the identification information of the networking unit in the current stage, that is, cascade information includes information of each optical port through which information is transferred and identification information of the networking units. After the cascade information is finally fed back to a backhaul information processing device (which may be a background management apparatus or a BBU), the backhaul information processing device may determine a current actual networking topology according to optical port information of the multiple stages of networking units and identification information of the multiple stages of networking units.

After the actual networking topology is determined, a data allocation link is determined according to the actual networking topology. Even if a fiber is plugged incorrectly in the network system, it can be ensured that data is correctly allocated.

How to determine the actual networking topology using the information backhaul method is described in detail hereinafter and not repeated here.

In the present disclosure, how to feed back the cascade information to the backhaul information processing device is not particularly limited. For example, each stage of networking unit may directly feed back the cascade information of the each stage of networking unit to a background, or each stage of networking unit may feed back the cascade information of the each stage of networking unit to a networking unit in an upper stage, and the cascade information is fed back stage by stage and finally fed back by a networking unit in a last stage to the backhaul information processing device uniformly.

An embodiment for the cascade information being "fed back stage by stage" is briefly described below.

In the embodiment for the cascade information being "fed back stage by stage", a networking unit in a first stage and the networking unit in the last stage have different situations from a networking unit in each intermediate stage.

When the networking unit in the current stage is not the networking unit in the last stage on a backhaul link, that the way of feeding back the cascade information of the networking unit in the current stage is fed back includes feeding back the cascade information of the networking unit in the current stage to the networking unit in the upper stage of the networking unit in the current stage.

When the networking unit in the current stage is not the networking unit in the first stage, the information backhaul method further includes: feeding back the cascade information of the networking unit in the current stage and cascade information fed back from a networking unit in the lower stage to the networking unit in the current stage simultaneously.

It is to be explained that "the networking unit in the upper stage" of the networking unit in the current stage refers to a networking unit that receives information from the networking unit in the current stage, and "the networking unit in the lower stage" of the networking unit in the current stage refers to a networking unit that sends information to the networking unit in the current stage.

In the present disclosure, the network system is not particularly limited. For example, the networking unit may be a base station, and the network system may be a network access system where multiple base stations are cascaded.

In another example, the network system may be an indoor distribution system with complex networking. For example, the networking unit includes a BBU bridge device, and the network system may include a BBU, multiple BBU bridge devices and multiple RRUs. Each BBU bridge device is configured with at least one RRU. In the embodiment shown in FIG. 3, one BBU bridge device is configured with two RRUs. Correspondingly, the cascade information may further include identification information of an RRU with which the BBU bridge device cooperates. The identification information of the RRU includes a device number of a device corresponding to the RRU and is used for identifying the RRU. For the indoor distribution system, the RRU may be a miniature RRU with a relatively small volume.

As an optional embodiment of the present disclosure, the optical port information includes at least one of: identification information of a transmitting optical port of the networking unit in the current stage, identification information of a transmitting optical port of the networking unit in the lower stage or status information of a receiving optical port of the networking unit in the current stage.

The identification information of the transmitting optical port of the networking unit in the current stage includes a number of the transmitting optical port of the networking unit in the current stage, the identification information of the transmitting optical port of the networking unit in the next stage includes a number of the transmitting optical port of the networking unit in the next stage, and the status information of the receiving optical port of the networking unit in the current stage includes indication information of whether the receiving optical port of the networking unit in the current stage normally receives the information fed back from the networking unit in the lower stage.

Figure 3:
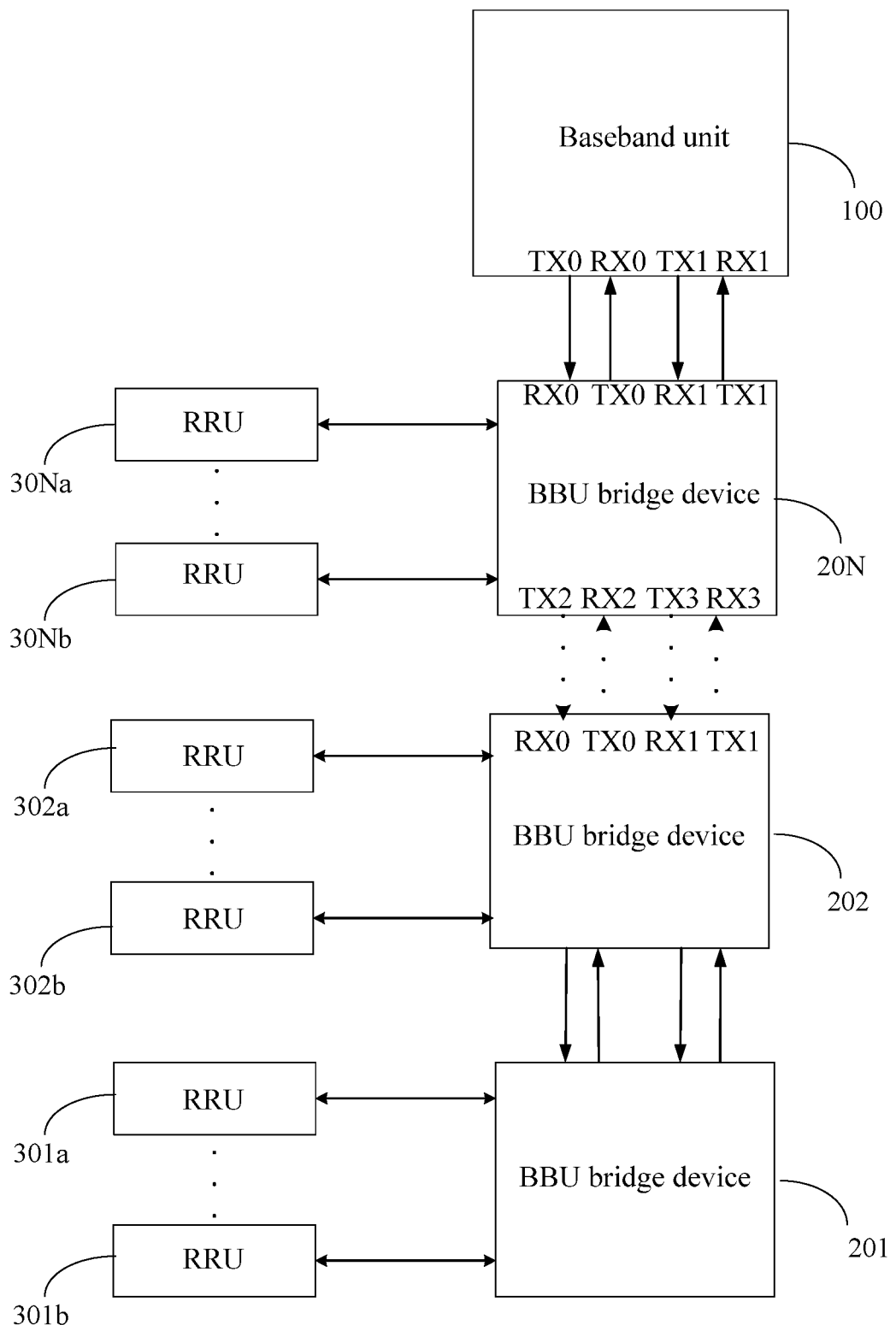
FIG. 3 is a schematic diagram of a correctly cascaded network system.

With FIG. 3 as an example, a manner for cascading multiple BBU bridge devices in a network system is briefly described.

The network system includes a BBU 100, N stages of BBU bridge devices and 2N RRUs. The N stages of BBU bridge devices are a BBU bridge device 201 in a first stage, a BBU bridge device 202 in a second stage, . . . and a BBU bridge device 20N in an N-th stage, respectively. The BBU bridge device 201 in the first stage corresponds to an RRU 301a and an RRU 301b, the BBU bridge device 202 in the second stage corresponds to an RRU 302a and an RRU 302b, and the BBU bridge device 20N in the N-th stage corresponds to an RRU 30Na and an RRU 30Nb. When the N stages of BBU bridge devices are cascaded, a transmitting optical port of one stage of BBU bridge device should be connected to a receiving optical port of one adjacent stage of BBU bridge device.

It is to be noted that in the embodiment of the present application, when the BBU bridge devices are cascaded, with uplink transmission (information is transferred in a sequence of 201, 202, . . . and 20N) as an example, a previous stage and a next stage are specified as follows: the BBU bridge device 202 in the second stage is referred to as a next stage of the BBU bridge device 201 in the first stage, that is, the BBU bridge device 202 in the second stage is referred to as an upper stage of the BBU bridge device 201 in the first stage, and the BBU bridge device 202 in the second stage is referred to as a previous stage of a BBU bridge device 203 in a third stage, that is, the BBU bridge device 202 in the second stage is referred to a lower stage of the BBU bridge device 203 in the third stage. With downlink transmission (information is transferred in a sequence of 20N, . . . , 202 and 201) as an example, the previous stage and the next stage are specified as follows: the BBU bridge device 202 in the second stage is referred to as a previous stage of the BBU bridge device 201 in the first stage, that is, the BBU bridge device 202 in the second stage is referred to as a lower stage of the BBU bridge device 201 in the first stage, and the BBU bridge device 202 in the second stage is referred to as a next stage of the BBU bridge device 203 in the third stage, that is, the BBU bridge device 202 in the second stage is referred to as an upper stage of the BBU bridge device 203 in the third stage.

Each stage of BBU bridge device has an optical port 0, an optical port 1, an optical port 2 and an optical port 3. The optical port 0 includes a transmitting optical port TX0 and a receiving optical port RX0, the optical port 1 includes a transmitting optical port TX1 and a receiving optical port RX1, the optical port 2 includes a transmitting optical port TX2 and a receiving optical port RX2, and the optical port 3 includes a transmitting optical port TX3 and a receiving optical port RX3.

When a fiber is not plugged incorrectly, an optical port 2 of a BBU bridge device in a next stage is connected to an optical port 0 of a BBU bridge device in a previous stage, and an optical port 3 of the BBU bridge device in the next stage is connected to an optical port 1 of the BBU bridge device in the previous stage. For example, a transmitting optical port TX2 of the optical port 2 of the BBU bridge device in the next stage is connected to a receiving optical port RX0 of the optical port 0 of the BBU bridge device in the previous stage, a transmitting optical port TX3 of the optical port 3 of the BBU bridge device in the next stage is connected to a receiving optical port RX1 of the optical port 1 of the BBU bridge device in the previous stage, and a receiving optical port RX3 of the optical port 3 of the BBU bridge device in the next stage is connected to a transmitting optical port TX1 of the optical port 1 of the BBU bridge device in the previous stage.

When the information backhaul method is performed, the acquired cascade information includes a device identifier (for example, a device number) of the BBU bridge device in the previous stage, an optical port number of an optical port through which the BBU bridge device in the previous stage is connected to a BBU bridge device in a current stage, a device identifier (for example, a device number) of the BBU bridge device in the current stage, a device identifier (for example, a device number) of the BBU bridge device in the next stage and an optical port number of an optical port through which the BBU bridge device in the current stage is connected to the bridge device in the next stage. The cascade information is transferred stage by stage, and backhaul information transferred by a BBU bridge device in a last stage may include a path through which the backhaul information passes, which is also the current actual networking topology.

In the present disclosure, a data format of the cascade information is not particularly limited. The meanings and formats of groups of data in the cascade information are shown in Table 1.

TABLE 1

| Control Word | Description | Specific Meaning |
| --- | --- | --- |
| RRU_ID of a device in a current stage | Device number of each RRU, where each station has a unique identifier. | Bit7 to bit0: RRU_ID information |
| RRU_ID of a device in a next stage | Each RRU device number, each site is unique identifier | Bit7 to bit0: RRU_ID information |
| Transmitting optical port number of the device in the current stage | Connection optical port number of the device in the current stage, which is used for identifying from which optical port of multiple optical ports the device in the current stage is interconnected. | Bit3 to bit0: information about the transmitting optical port number |
| Receiving optical port number of the device in the next stage | Connection optical port number of the device in the next stage, which is used for identifying from which optical port of multiple optical ports the device in the next stage is interconnected. | Bit3 to bit0: information about the receiving optical number |
| Status of a receiving optical port of the device in the next stage | Receiving (RX) status of the optical port of the device in the next stage, where only when this signal is normal, the RRU_ID and optical port number of a device in an upper stage of the device in the next stage are extracted, so as to avoid misinterpretation. | Bit0: status of the receiving optical port, where a value of 1 indicates normal reception, and a value of 0 indicates abnormal reception |

The RRU_ID of the device in the current stage is an RRU device identification number of a Common Public Radio Interface (CPRI) link, which occupies one byte and corresponds, from a most significant bit to a least significant bit, to bit7 to bit0 of a customized field, respectively. Bit7 to bit0 are used for transferring an RRU device identification number of each device on the CPRI link in an entire base station.

The RRU_ID of the device in the next stage is an RRU device identification number of the CPRI link, which occupies one byte and corresponds, from the most significant bit to the least significant bit, to bit7 to bit0 of the customized field, respectively. Bit7 to bit0 are used for transferring the RRU device identification number of each device on the CPRI link in the entire base station. The control word (the RRU_ID of a device in a next stage) is sent to the device in the upper stage from the device in the next stage.

The transmitting optical port number of the device in the current stage is the connection optical port number of the device in the current stage, which occupies 4 bits and is used for identifying from which optical port of multiple optical ports the device in the current stage is interconnected to the device in the next stage. For example, if the device in the current stage and the device in the next stage are interconnected through the optical port 2 and the optical port 3, that a value of the 4 bits is 2 indicates that the information is sent through the optical port 2 of the device in the current stage.

The receiving optical port number of the device in the next stage is the connection optical port number of the device in the next stage, which occupies 4 bits and is used for identifying from which optical port of multiple optical ports the device in the next stage is interconnected to the device in the upper stage. For example, if the device in the next stage and the device in the upper stage are interconnected through the optical port 0 and the optical port 1, that a value of the 4 bits is 0 indicates that the information is received through the optical port 0 of the device in the next stage. The control word (the receiving optical port number of the device in the next stage) is sent to the device in the upper stage by the device in the next stage.

The status of the receiving optical port of the device in the next stage is the receiving (RX) status of the optical port of the device in the next stage, which occupies 1 bit. Only when this signal is normal, the RRU_ID and the optical port number of the device in the upper stage of the device in the next stage are extracted, so as to avoid misinterpretation. A value of 1 indicates normal reception of a receiving end, and a value of 0 indicates abnormal reception of the receiving end. The control word (the status of the receiving optical port of the device in the next stage) is sent to the device in the upper stage by the device in the next stage.

A process of performing the information backhaul method according to the present disclosure is equivalent to a process of collecting and transmitting underlying information of the networking unit in the upper stage and the networking unit in the lower stage.

Figure 2:
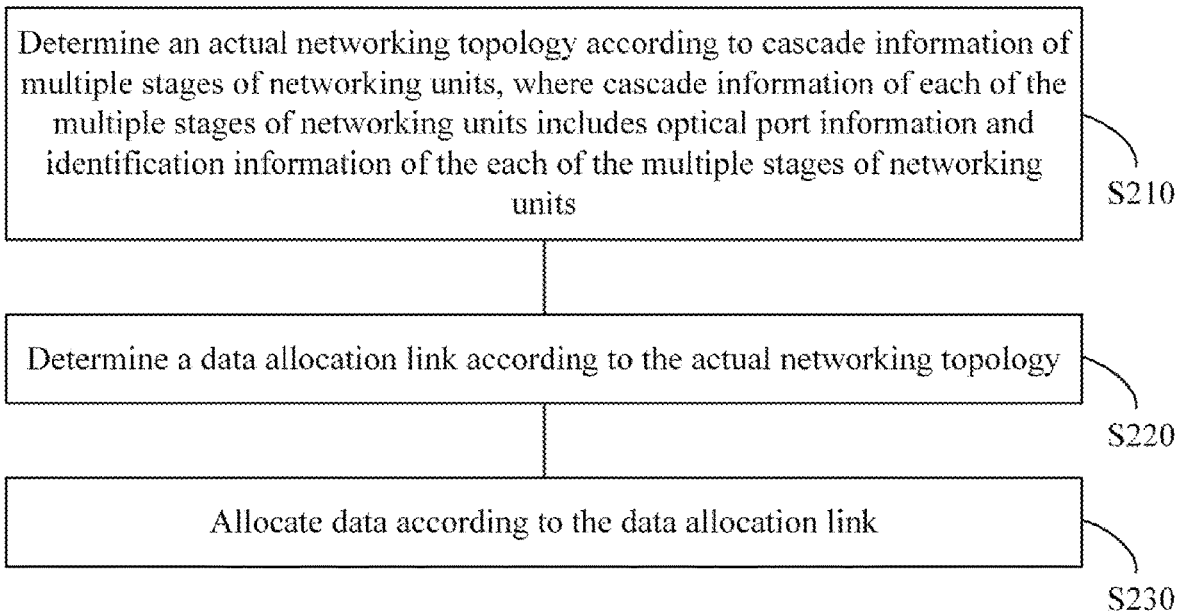
FIG. 2 is a flowchart of a data allocation method according to the present disclosure.

As a second aspect of the present disclosure, a data allocation method is provided. As shown in FIG. 2, the data allocation method includes steps S210 to S230.

In step S210, an actual networking topology is determined according to cascade information of multiple stages of networking units, where cascade information of each of the multiple stages of networking units includes optical port information and identification information of the each of the multiple stages of networking units.

In step S220, a data allocation link is determined according to the actual networking topology.

In step S230, data is allocated according to the data allocation link.

Since backhaul information provided by each stage of networking unit includes the corresponding cascade information, in the data allocation method according to the present disclosure, the finally determined data allocation link is consistent with the actual networking topology. Therefore, no data allocation error occurs. Moreover, a data link is re-determined, which can ensure that the data is allocated to a correct device without plugging and unplugging a fiber again, thereby reducing an operation difficulty and saving labor resources.

As described above, in the present disclosure, the data may be in-phase and quadrature (IQ) data.

The multiple stages of networking units are assembled according to a preset networking topology. Moreover, a data allocation link is determined. In the case where no fiber is plugged incorrectly, the actual networking topology is the same as the preset networking topology. In this case, the data is allocated according to a predetermined data allocation link. To reduce calculation steps, optionally, the data allocation method further includes a step between steps S210 and S220.

The actual networking topology is compared with the preset networking topology such that whether the actual networking topology is the same as the preset networking topology is determined.

When the actual networking topology is different from the preset networking topology, step S220 is performed.

When the actual networking topology is the same as the preset networking topology, the data is allocated directly by using the data allocation link in the preset networking topology without re-determining the data allocation link, thereby reducing the calculation steps and improving data allocation efficiency.

Figure 4:
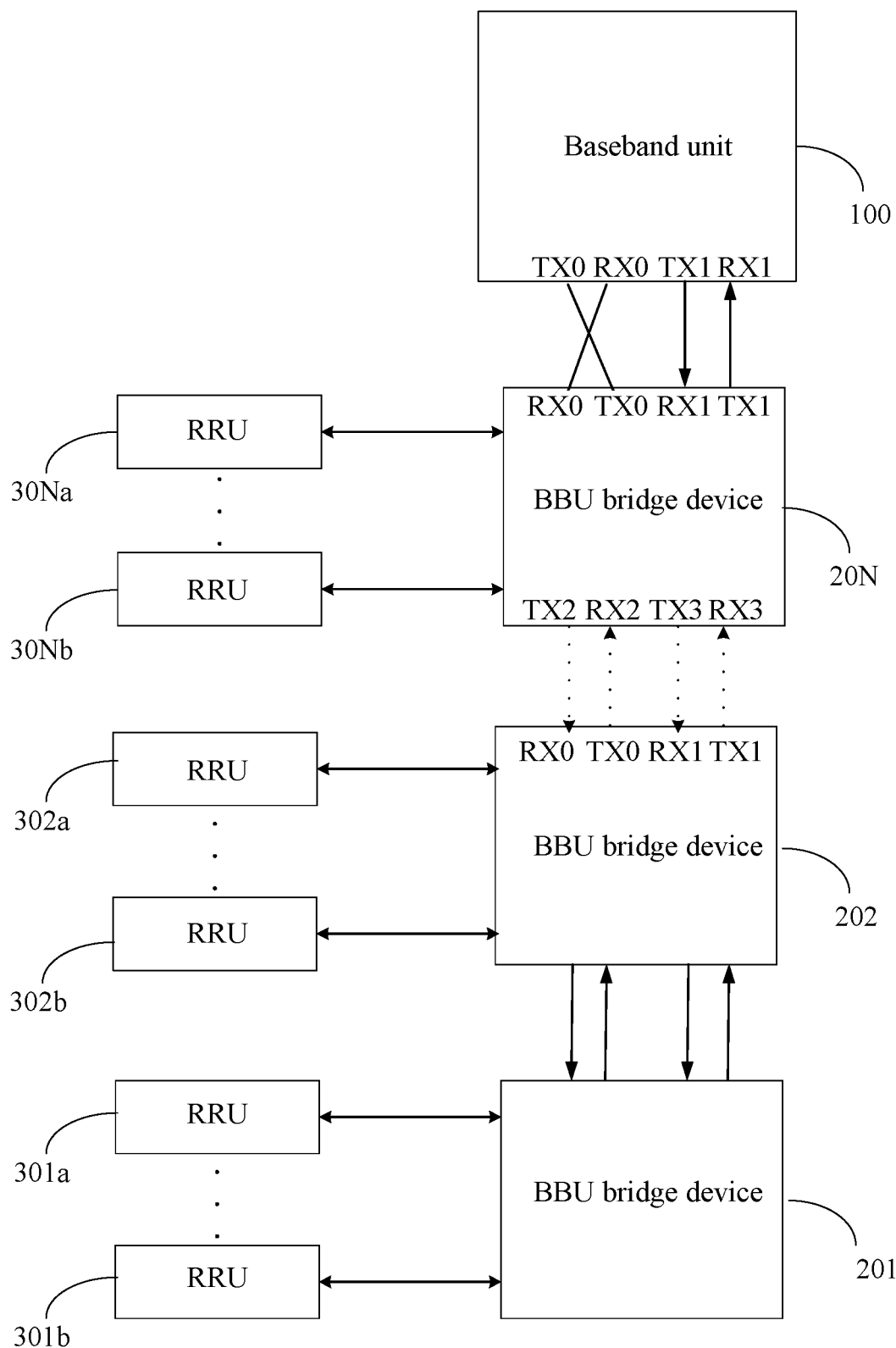
FIG. 4 is a schematic diagram of a scenario where a fiber between an optical port of a BBU and an optical port of a BBU bridge device in a first stage is abnormally connected.

As an optional embodiment, in the absence of cascade information of a networking unit in any stage, an alarm signal is generated. After receiving the alarm signal, a background operator plugs and unplugs a fiber again on site. As shown in FIG. 4, a transmitting optical port TX0 of a BBU 100 is connected to a transmitting optical port TX0 of a BBU bridge device in an N-th stage, and a receiving optical port RX0 of the BBU 100 is connected to a receiving optical port RX0 of the BBU bridge device 20N in the N-th stage. Therefore, a signal sent by the BBU 100 to the BBU bridge device in the N-th stage cannot be received, and a signal sent by the BBU bridge device in the N-th stage to the BBU 100 cannot be received. As a result, backhaul information is lack of information about the transmitting optical port TX0 of the BBU 100, information about the receiving optical port RX0 of the BBU 100, information about the transmitting optical port TX0 of the BBU bridge device 20N in the N-th stage and information about the receiving optical port RX0 of the BBU bridge device 20N in the N-th stage. This indicates that fibers are plugged incorrectly into the above optical ports, and a failure can only be ruled out in a manner of re-plugging the fibers.

A specific implementation process of the data allocation method according to the present disclosure is described in detail with reference to FIGS. 3 to 8.

It is to be noted that the preset networking topology is pre-stored in the background.

Embodiment One

FIG. 3 shows the case where all stages of networking units in a network system are correctly cascaded to form the preset networking topology. An optical port 2 of a BBU bridge device in a next stage is connected to an optical port 0 of a BBU bridge device in a previous stage, and an optical port 3 of the BBU bridge device in the next stage is connected to an optical port 1 of the BBU bridge device in the previous stage. For example, a transmitting optical port TX2 of the optical port 2 of the BBU bridge device in the next stage is connected to a receiving optical port RX0 of the optical port 0 of the BBU bridge device in the previous stage, a transmitting optical port TX3 of the optical port 3 of the BBU bridge device in the next stage is connected to a receiving optical port RX1 of the optical port 1 of the BBU bridge device in the previous stage, and a receiving optical port RX3 of the optical port 3 of the BBU bridge device in the next stage is connected to a transmitting optical port TX1 of the optical port 1 of the BBU bridge device in the previous stage.

When data is allocated using the data allocation method according to the present application, the method includes the steps below.

An actual networking topology is determined according to cascade information of multiple stages of networking units.

The actual networking topology is compared with the preset networking topology.

It is determined that the actual networking topology is the same as the preset networking topology.

The data is allocated according to a path of the preset networking topology.

Embodiment Two

FIG. 4 is a schematic diagram of a network system in a first scenario where a fiber is plugged incorrectly. A transmitting optical port TX0 of a BBU 100 is connected to a transmitting optical port TX0 of a BBU bridge device 20N in an N-th stage, and a receiving optical port RX0 of the BBU 100 is connected to a receiving optical port RX0 of the BBU bridge device 20N in the N-th stage. In this network system, optical ports of remaining BBU bridge devices are connected correctly.

Since the transmitting optical port TX0 of the BBU 100 is connected to the transmitting optical port TX0 of the BBU bridge device 20N in the N-th stage, and the receiving optical port RX0 of the BBU 100 is connected to the receiving optical port RX0 of the BBU bridge device 20N in the N-th stage, information cannot be transferred between an optical port 0 of the BBU 100 and an optical port 0 of the BBU bridge device 20N in the N-th stage. The finally obtained cascade information includes no information about the optical port 0 of the BBU 100 and the optical port 0 of the BBU bridge device 20N in the N-th stage. At this time, an alarm signal is generated to prompt maintenance personnel to re-plug a fiber between the BBU 100 and the BBU bridge device 20N in the N-th stage.

Embodiment Three

Figure 5:
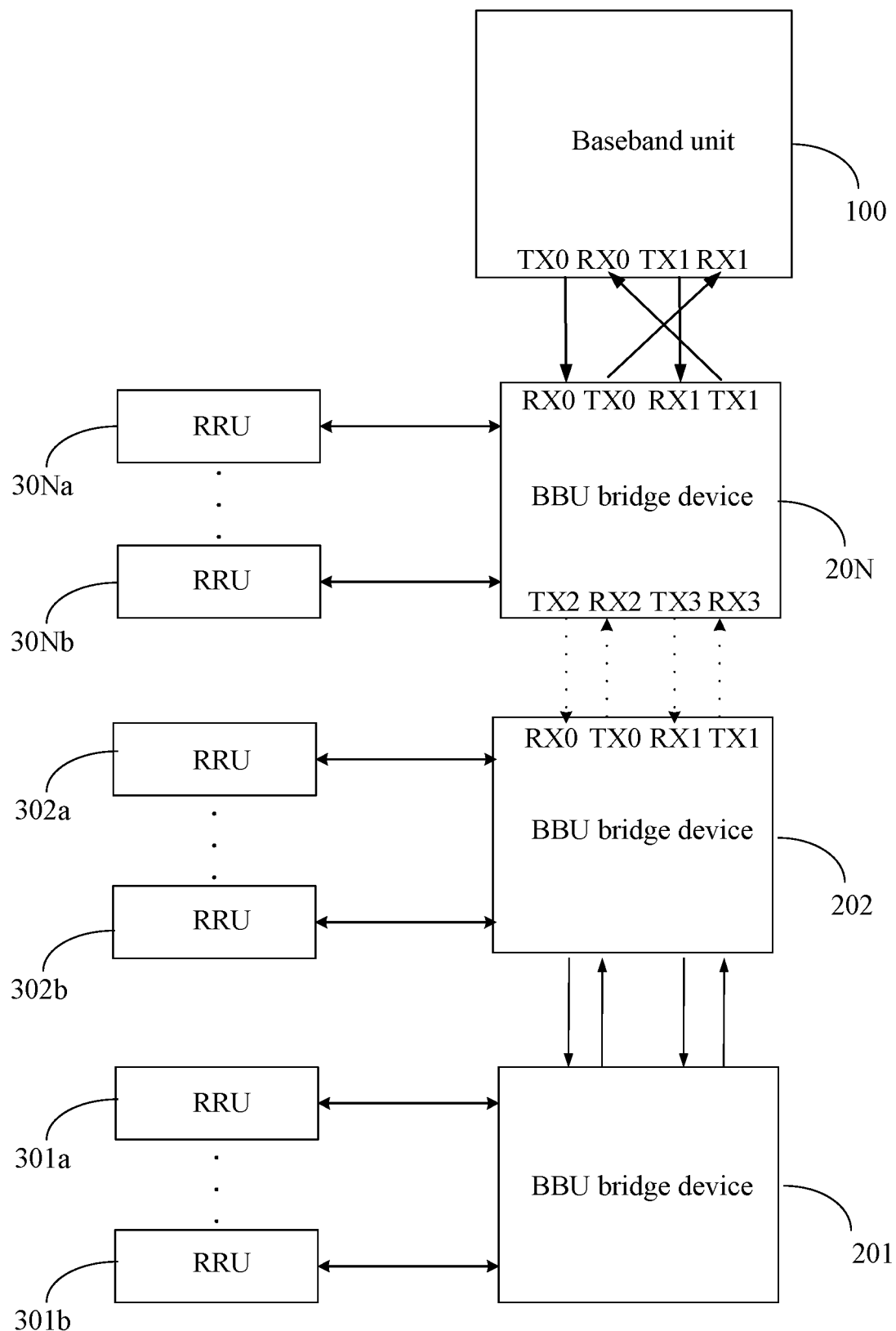
FIG. 5 is a schematic diagram of another scenario where a fiber between an optical port of a BBU and an optical port of a BBU bridge device in a first stage is abnormally connected.

FIG. 5 is a schematic diagram of a network system in a second scenario where a fiber is plugged incorrectly. A transmitting optical port TX0 of an optical port 0 of a BBU 100 is normally connected to RX0 of an optical port 0 of a BBU bridge device 20N in an N-th stage, and a transmitting optical port TX1 of an optical port 1 of the BBU 100 is normally connected to a receiving optical port RX1 of an optical port 1 of the BBU bridge device 20N in the N-th stage. However, a receiving optical port RX0 of the optical port 0 of the BBU 100 is abnormally connected to a transmitting optical port TX1 of the optical port 1 of the BBU bridge device 20N in the N-th stage, and a receiving optical port RX1 of the optical port 1 of the BBU 100 is abnormally connected to a transmitting optical port TX0 of the optical port 0 of the BBU bridge device 20N in the N-th stage. In this case, the abnormal connections in the networking topology can be found through cascade information fed back by multiple stages of BBU bridge devices.

The data allocation method includes the steps below.

An actual networking topology is determined according to cascade information of multiple stages of networking units, where cascade information of each of the multiple stages of networking units includes optical port information of the each of the multiple stages of networking units and identification information of the each of the multiple stages of networking units.

The actual networking topology is compared with a preset networking topology.

It is determined that the actual networking topology is different from the preset networking topology.

A data allocation link is determined according to the actual networking topology.

Actual downlink (normal) of a baseband IQ resource of an RRU 30Na: the optical port 0 of the BBU 100→the optical port 0 of the BBU bridge device 20N in the N-th stage→the RRU 30Na.

Actual uplink path (abnormal) of the baseband IQ resource of the RRU 30Na: the optical port 0 of the BBU 100←the optical port 1 of the BBU bridge device 20N in the N-th stage←the RRU 30Na.

After identifying the abnormality, the background initiates the configuration and distribution of "an IQ resource configuration link after the topology is corrected" and re-establishes a cell, preventing service personnel from going to a station again and improving station-opening efficiency.

Embodiment Four

Figure 6:
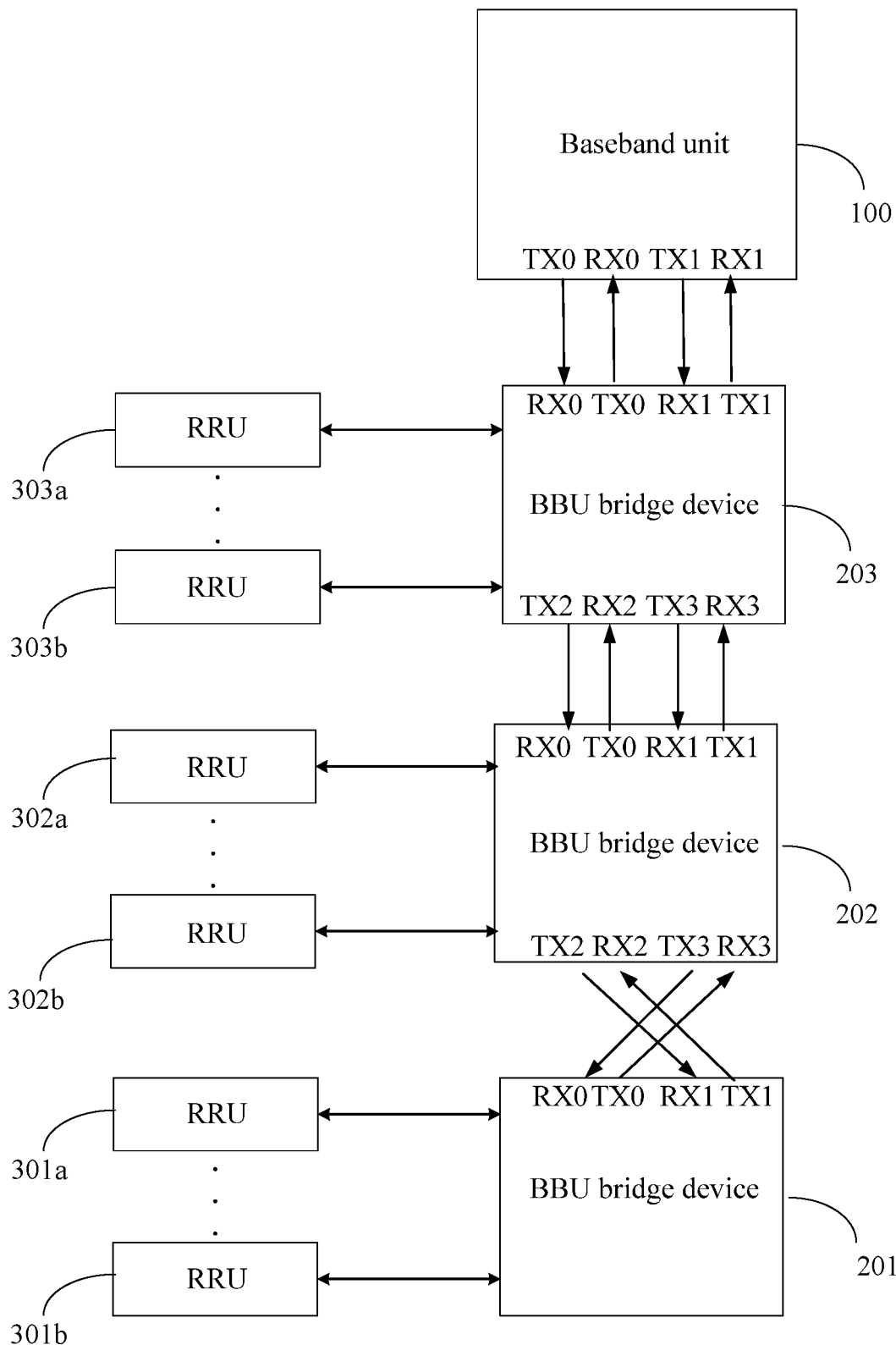
FIG. 6 is a schematic diagram of a scenario where a fiber between an optical port of a BBU bridge device in a second stage and an optical port of a BBU bridge device in a third stage is abnormally connected.

FIG. 6 is a schematic diagram of a network system in a third scenario where a fiber is plugged incorrectly. In this scenario, fibers in pairs are plugged incorrectly, an optical port 2 of a BBU bridge device 202 in a second stage is abnormally connected to an optical port 1 of a BBU bridge device 201 in a first stage, and an optical port 3 of the BBU bridge device 202 in the second stage is abnormally connected to an optical port 0 of the BBU bridge device 201 in the first stage. In this case, the abnormal connections in the networking topology can be found through cascade information fed back by the BBU bridge device 202 in the second stage and cascade information fed back by the BBU bridge device 201 in the first stage.

The data allocation method includes the steps below.

An actual networking topology is determined according to cascade information of multiple stages of networking units, where cascade information of each of the multiple stages of networking units includes optical port information of the each of the multiple stages of networking units and identification information of the each of the multiple stages of networking units.

The actual networking topology is compared with a preset networking topology.

It is determined that the actual networking topology is different from the preset networking topology.

A data allocation link is determined according to the actual networking topology.

Original uplink/downlink path (original) of a baseband IQ resource of an RRU 301a: an optical port 0 of a BBU 100—an optical port 0 of a BBU bridge device 203 in a third stage—an optical port 2 of the BBU bridge device 203 in the third stage—an optical port 0 of the BBU bridge device 202 in the second stage—the optical port 2 of the BBU bridge device 202 in the second stage—the optical port 0 of the BBU bridge device 201 in the first stage—the RRU 301a.

Actual uplink/downlink path of the baseband IQ resource of the RRU 301a: the optical port 0 of the BBU 100—the optical port 0 of the BBU bridge device 203 in the third stage—the optical port 2 of the BBU bridge device 203 in the third stage—the optical port 0 of the BBU bridge device 202 in the second stage—the optical port 2 of the BBU bridge device 202 in the second stage—the optical port 1 of the BBU bridge device 201 in the first stage—the RRU 301a.

After identifying the abnormality, the background initiates the configuration and distribution of "an IQ resource configuration link after the topology is corrected" and re-establishes a cell, preventing service personnel from going to a station again and improving station-opening efficiency.

Embodiment Five

Figure 7:
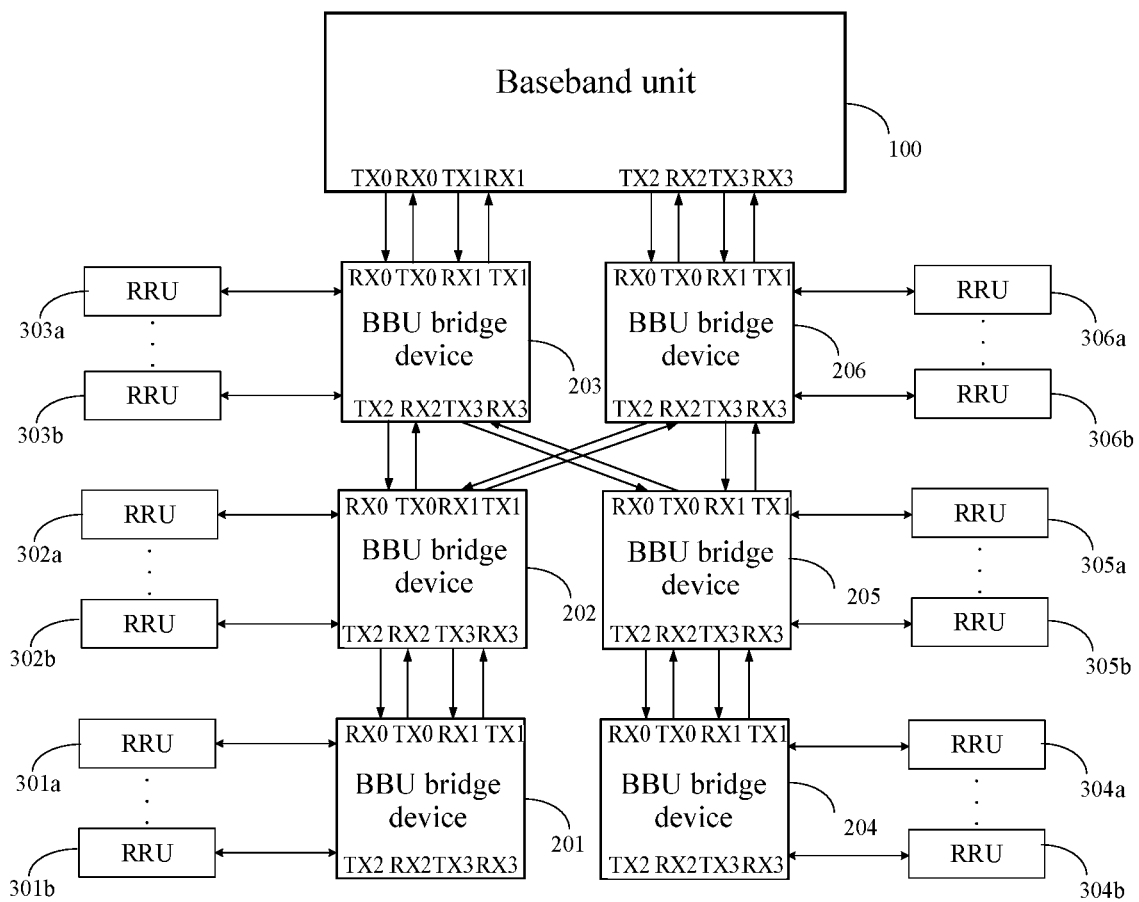
FIG. 7 is a schematic diagram of a scenario where a fiber between an optical port of a BBU bridge device in a first stage and an optical port of a BBU bridge device in a fifth stage is abnormally connected and a fiber between an optical port of a BBU bridge device in a fourth stage and an optical port of a BBU bridge device in a second stage is abnormally connected.

FIG. 7 is a schematic diagram of a network system in a fourth scenario where a fiber is plugged incorrectly. In the network system shown in FIG. 7, a BBU 100 is directly connected to a BBU bridge device 203 in a third stage and a BBU bridge device 206 in a sixth stage. The BBU bridge device 203 in the third stage, a BBU bridge device 202 in a second stage and a BBU bridge device 201 in a first stage are cascaded in sequence. The BBU bridge device 206 in the sixth stage, a BBU bridge device 205 in a fifth stage and a BBU bridge device 204 in a fourth stage are cascaded in sequence.

In this scenario, fibers in pairs are plugged incorrectly, an optical port 3 of the BBU bridge device 203 in the third stage is abnormally connected to an optical port 0 of the BBU bridge device 205 in the fifth stage, and an optical port 2 of the BBU bridge device 206 in the sixth stage is abnormally connected to an optical port 1 of the BBU bridge device 202 in the second stage. In this case, the abnormal connections in the networking topology of a foreground can be found through cascade information of the BBU bridge device 203 in the third stage, cascade information of the BBU bridge device 206 in the sixth stage, cascade information of the BBU bridge device 205 in the fifth stage and cascade information of the BBU bridge device 202 in the second stage.

The data allocation method includes the steps below.

An actual networking topology is determined according to cascade information of multiple stages of networking units, where cascade information of each of the multiple stages of networking units includes optical port information of the each of the multiple stages of networking units and identification information of the each of the multiple stages of networking units.

The actual networking topology is compared with a preset networking topology.

It is determined that the actual networking topology is different from the preset networking topology.

A data allocation link is determined according to the actual networking topology.

Original uplink/downlink path of a baseband IQ resource of an RRU 302b: an optical port 1 of the BBU 100—an optical port 1 of the BBU bridge device 203 in the third stage—the optical port 3 of the BBU bridge device 203 in the third stage—the optical port 1 of the BBU bridge device 202 in the second stage—the RRU 302b.

Actual uplink/downlink path of the baseband IQ resource of the RRU 302b: an optical port 2 of the BBU 100—an optical port 0 of the BBU bridge device 206 in the sixth stage—the optical port 2 of the BBU bridge device 206 in the sixth stage—the optical port 1 of the BBU bridge device 202 in the second stage—the RRU 302b.

After identifying the abnormality, the background initiates the configuration and distribution of "an IQ resource configuration link after the topology is corrected" and re-establishes a cell, preventing service personnel from going to a station again and improving station-opening efficiency.

Original uplink/downlink path of a baseband IQ resource of an RRU 305b: the optical port 2 of the BBU 100—the optical port 0 of the BBU bridge device 206 in the sixth stage—the optical port 2 of the BBU bridge device 206 in the sixth stage—the optical port 0 of the BBU bridge device 205 in the fifth stage—the RRU 305b.

Actual uplink/downlink path of the baseband IQ resource of the RRU 305b: the optical port 1 of the BBU 100—the optical port 1 of the BBU bridge device 203 in the third stage—the optical port 3 of the BBU bridge device 203 in the third stage—the optical port 0 of the BBU bridge device 205 in the fifth stage—the RRU 305b.

After identifying the abnormality, the background initiates the configuration and distribution of "an IQ resource configuration link after the topology is corrected" and re-establishes a cell, preventing the service personnel from going to a station again and improving station-opening efficiency.

Embodiment Six

Figure 8:
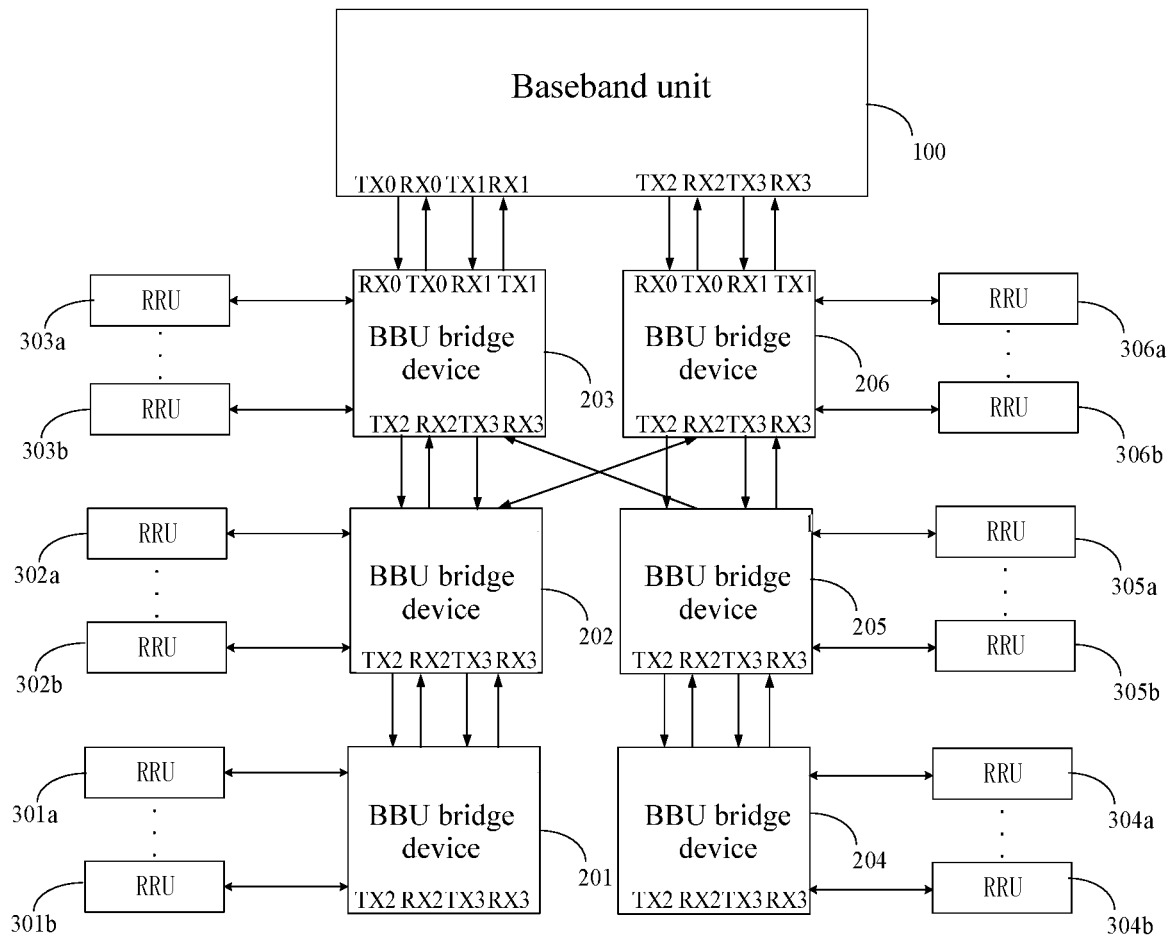
FIG. 8 is a schematic diagram of another scenario where a fiber between an optical port of a BBU bridge device in a first stage and an optical port of a BBU bridge device in a fifth stage is abnormally connected and a fiber between an optical port of a BBU bridge device in a fourth stage and an optical port of a BBU bridge device in a second stage is abnormally connected.

FIG. 8 is a schematic diagram of a network system in a fifth scenario where a fiber is plugged incorrectly. In the network system shown in FIG. 8, a BBU 100 is directly connected to a BBU bridge device 203 in a third stage and a BBU bridge device 206 in a sixth stage. A BBU bridge device 201 in a first stage, a BBU bridge device 202 in a second stage and the BBU bridge device 203 in the third stage are cascaded in sequence. A BBU bridge device 204 in a fourth stage, a BBU bridge device 205 in a fifth stage and the BBU bridge device 206 in the sixth stage are cascaded in sequence.

In this scenario, fibers are plugged incorrectly. A receiving optical port RX3 of an optical port 3 of the BBU bridge device 203 in the third stage is abnormally connected to a transmitting optical port TX0 of an optical port 0 of the BBU bridge device 205 in the fifth stage, and a transmitting optical port TX1 of an optical port 1 of the BBU bridge device 202 in the second stage is abnormally connected to a receiving optical port RX2 of an optical port 2 of the BBU bridge device 206 in the sixth stage. In this case, the abnormal connections in the networking topology of a foreground can be found through cascade information of the BBU bridge device 203 in the third stage, cascade information of the BBU bridge device 205 in the fifth stage, cascade information of the BBU bridge device 202 in the second stage and cascade information of the BBU bridge device 206 in the sixth stage.

The data allocation method includes the steps below.

An actual networking topology is determined according to cascade information of multiple stages of networking units, where cascade information of each of the multiple stages of networking units includes optical port information of the each of the multiple stages of networking units and identification information of the each of the multiple stages of networking units.

The actual networking topology is compared with a preset networking topology.

It is determined that the actual networking topology is different from the preset networking topology.

A data allocation link is determined according to the actual networking topology.

Original uplink path of a baseband IQ resource of an RRU 302b: an optical port 1 of the BBU 100←an optical port 1 of the BBU bridge device 203 in the third stage←the optical port 3 of the BBU bridge device 203 in the third stage←the optical port 1 of the BBU bridge device 202 in the second stage←the RRU 302b.

Actual uplink path of the baseband IQ resource of the RRU 302b: an optical port 2 of the BBU 100←an optical port 0 of the BBU bridge device 206 in the sixth stage←the optical port 2 of the BBU bridge device 206 in the sixth stage←the optical port 1 of the BBU bridge device 202 in the second stage←the RRU 302b.

A downlink path of the baseband IQ resource of the RRU 302b is normal.

After identifying the abnormality, the background initiates the configuration and distribution of "an IQ resource configuration link after the topology is corrected" and re-establishes a cell, preventing service personnel from going to a station again and improving station-opening efficiency.

Original uplink path of a baseband IQ resource of an RRU 305b: the optical port 2 of the BBU 100←the optical port 0 of the BBU bridge device 206 in the sixth stage←the optical port 2 of the BBU bridge device 206 in the sixth stage←the optical port 0 of the BBU bridge device 205 in the fifth stage←the RRU 305b.

Actual uplink path of the baseband IQ resource of the RRU 305b: the optical port 1 of the BBU 100←the optical port 1 of the BBU bridge device 203 in the third stage←the optical port 3 of the BBU bridge device 203 in the third stage←the optical port 0 of the BBU bridge device 205 in the fifth stage←the RRU 305b.

A downlink path of the baseband IQ resource of the RRU 305b is normal.

After identifying the abnormality, the background initiates the configuration and distribution of "an IQ resource configuration link after the topology is corrected" and re-establishes a cell, preventing the service personnel from going to a station again and improving the station-opening efficiency.

Figure 9:
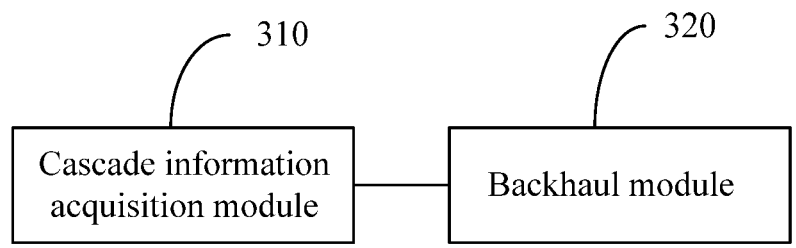
FIG. 9 is a schematic diagram of modules of a networking unit according to the present disclosure.

As a third aspect of the present disclosure, a networking unit is provided. The networking unit is applied to each of multiple stages of networking units in a network system and includes multiple optical ports. As shown in FIG. 9, the networking unit further includes a cascade information acquisition module 310 and a backhaul module 320. The networking unit according to the present disclosure is configured to perform the preceding information backhaul method according to the present disclosure.

The cascade information acquisition module 310 is configured to perform step S110, that is, the cascade information acquisition module is configured to acquire cascade information of a networking unit in a current stage, where the cascade information includes optical port information of the networking unit in the current stage and identification information of the networking unit in the current stage.

The backhaul module 320 is configured to perform step S120, that is, the backhaul module 320 is configured to feed back the cascade information of the networking unit in the current stage.

Figure 11:
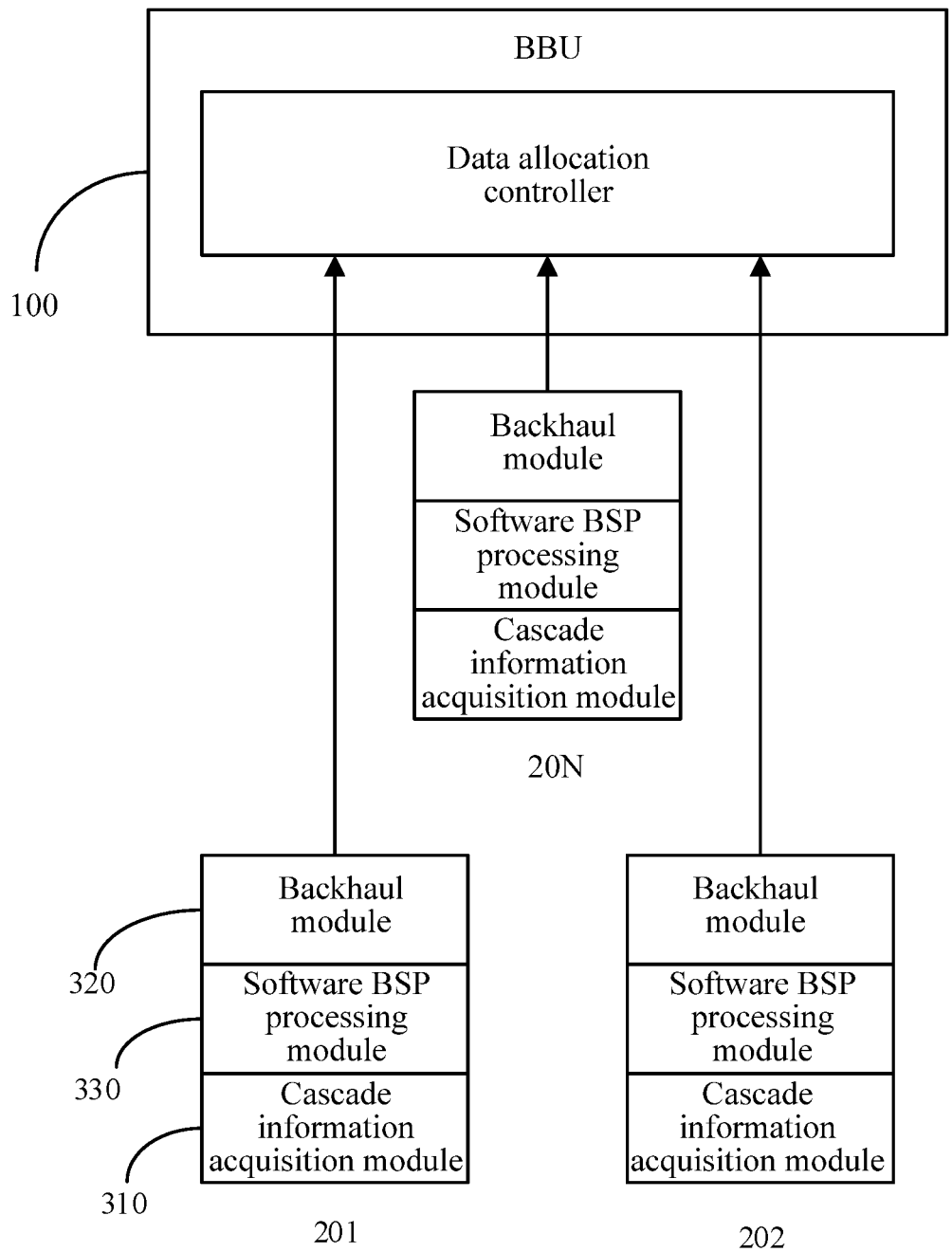
FIG. 11 is a schematic diagram illustrating that a data allocation controller is integrated in a BBU.

Optionally, the networking unit may further include a software board support package (BSP) processing module 330 (see FIG. 11).

The software BSP processing module 330 mainly completes an underlying driver configuration. For example, the software BSP processing module 330 configures a cell IQ of a field-programmable gate array (FPGA), acquires networking-related information, and reports the networking-related information to the backhaul module 320.

As a fourth aspect of the present disclosure, a networking unit is provided. The networking unit includes a memory and at least one processor.

The memory stores an executable program.

When the at least one processor calls the executable program, the at least one processor can perform the preceding data backhaul method according to the present disclosure.

Figure 10:
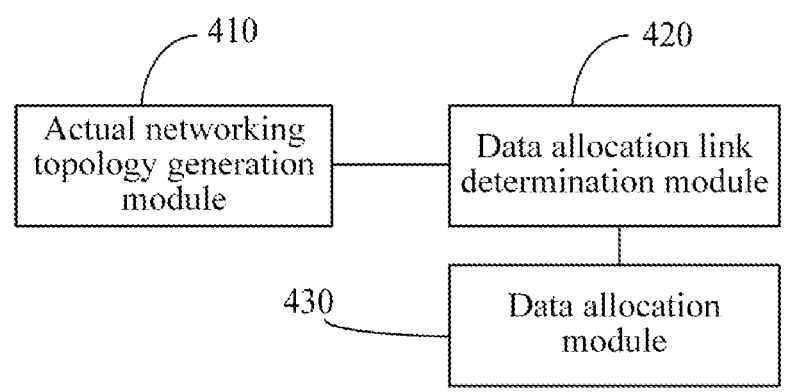
FIG. 10 is a schematic diagram of modules of a data allocation controller according to the present disclosure.

As a fifth aspect of the present disclosure, a data allocation controller is provided. As shown in FIG. 10, the data allocation controller includes an actual networking topology generation module 410, a data allocation link determination module 420 and a data allocation module 430. The data allocation controller is configured to perform the preceding data allocation method according to the present disclosure.

The actual networking topology generation module 410 is configured to perform step S210, that is, the actual networking topology generation module 410 is configured to determine an actual networking topology according to cascade information of multiple stages of networking units, where cascade information of each of the multiple stages of networking units includes optical port information of the each of the multiple stages of networking units and identification information of the each of the multiple stages of networking units.

The data allocation link determination module 420 is configured to perform step S220, that is, the data allocation link determination module 420 is configured to determine a data allocation link according to the actual networking topology.

The data allocation module 430 is configured to perform step S230, that is, the data allocation module 430 is configured to allocate data according to the data allocation link.

Figure 12:
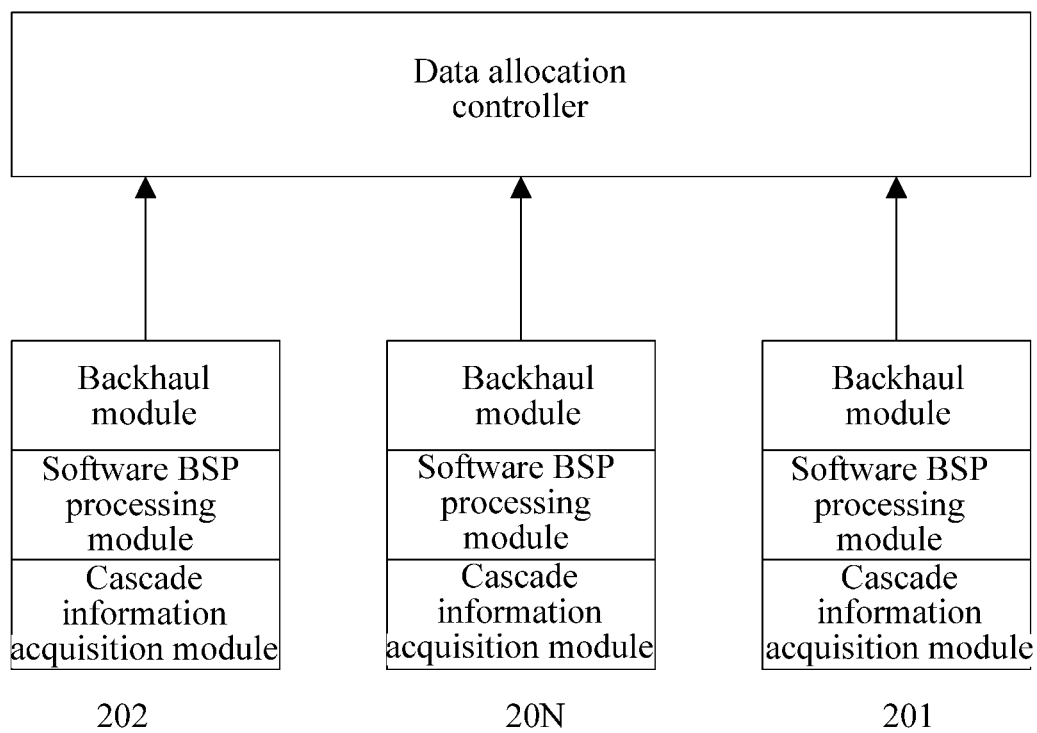
FIG. 12 is a schematic diagram illustrating that a data allocation controller is integrated in a background management device.

As described above, the cascade information is finally fed back to a backhaul information processing device (which may be a background management apparatus or a BBU), where the "backhaul information processing device" is the data allocation controller according to the fourth aspect of the present disclosure. That is, the data allocation controller may be integrated in the BBU (as shown in FIG. 11) or disposed in the background management apparatus independent of the BBU (as shown in FIG. 12).

As a sixth aspect of the present disclosure, a data allocation controller is provided. The data allocation controller includes a memory and at least one processor.

The memory stores an executable program.

When the at least one processor calls the executable program, the at least one processor can perform the preceding data allocation method according to the present disclosure.

As a seventh aspect of the present disclosure, a network system is provided. The network system includes a data allocation controller and multiple stages of networking units that are cascaded, where each of the multiple stages of networking units is the preceding networking unit of the present disclosure and the data allocation controller is the preceding data allocation controller of the present disclosure.

Optionally, the network system further includes a BBU and multiple RRUs. The networking unit includes a BBU bridge device, a BBU bridge device in a last stage communicates with the BBU, and a BBU bridge device in each stage corresponds to at least one RRU.

As an eighth aspect of the present disclosure, a computer-readable storage medium storing an executable program is provided, where the executable program, when executed, can implement the preceding data backhaul method according to the present disclosure.

As a ninth aspect of the present disclosure, a computer-readable storage medium storing an executable program is provided, where the executable program, when executed, can implement the preceding data allocation method according to the present disclosure.

The computer-readable storage medium includes a volatile or non-volatile medium or a removable or non-removable medium implemented in any method or technology for storing information (such as computer-readable instructions, data structures, program modules or other data). The computer-readable storage medium includes, but is not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storages, a magnetic cassette, a magnetic tape, a magnetic disk or other magnetic storage media, or any other medium that can be used for storing desired information and that can be accessed by a computer.

What is claimed is:

1. An information backhaul method, applied to a networking unit in a network system, wherein the network system comprises a plurality of stages of networking units that are cascaded, each of the plurality of stages of networking units comprises a plurality of optical ports, and the information backhaul method comprises:

acquiring cascade information of a networking unit in a current stage, wherein the cascade information of the networking unit in the current stage comprises optical port information and identification information of the networking unit in the current stage; and feeding back the cascade information of the networking unit in the current stage to cause a backhaul information processing device to perform;

determining an actual networking topology according to optical port information of the each of the plurality of stages of networking units;

comparing the actual networking topology with a preset networking topology to determine whether the actual networking topology is the same as the preset networking topology; and in response to a determination result that the actual networking topology is different from the preset networking topology, determining a data allocation link according to the actual networking topology, and allocating data according to the data allocation link determined according to the actual networking topology.

2. The method according to claim 1, wherein in response to the networking unit in the current stage being not a networking unit in a last stage on a backhaul link, feeding back the cascade information of the networking unit in the current stage comprises: sending the cascade information of the networking unit in the current stage to a networking unit in an upper stage of the networking unit in the current stage; and in response to the networking unit in the current stage being not a networking unit in a first stage, the method further comprises: simultaneously feeding back the cascade information of the networking unit in the current stage and cascade information fed back from a networking unit in a lower stage to the networking unit in the current stage.

3. The method according to claim 1 or 2, wherein for each of the plurality of stages of networking units, each of the plurality of optical ports comprises a receiving optical port and a transmitting optical port, and the optical port information of the networking unit in the current stage comprises at least one of:

identification information of a transmitting optical port of the networking unit in the current stage, identification information of a transmitting optical port of the networking unit in the lower stage or status information of a receiving optical port of the networking unit in the current stage.

4. The method according to claim 2, wherein each of the plurality of stages of networking units comprises a baseband unit (BBU) bridge device which cooperates with at least one radio remote unit (RRU); and the cascade information of the networking unit in the current stage further comprises identification information of at least one RRU cooperating with a BBU bridge device comprised in the networking unit in the current stage.

5. The method according to claim 2, wherein for each of the plurality of stages of networking units, each of the plurality of optical ports comprises a receiving optical port and a transmitting optical port, and the optical port information of the networking unit in the current stage comprises at least one of:

identification information of a transmitting optical port of the networking unit in the current stage, identification information of a transmitting optical port of the networking unit in the lower stage or status information of a receiving optical port of the networking unit in the current stage.

6. The method according to claim 1, wherein each of the plurality of stages of networking units comprises a baseband unit (BBU) bridge device which cooperates with at least one radio remote unit (RRU); and the cascade information of the networking unit in the current stage further comprises identification information of at least one RRU cooperating with a BBU bridge device comprised in the networking unit in the current stage.

7. A networking unit, comprising:

a memory storing an executable program; and at least one processor, wherein when the at least one processor calls the executable program, the at least one processor is capable of performing the information backhaul method according to claim 1.

8. A non-transitory computer-readable storage medium storing an executable program, wherein the executable program, when executed, is capable of implementing the information backhaul method according to claim 1.

9. A data allocation method, applied to a data allocation controller which is a backhaul information processing device, comprising:

determining an actual networking topology according to cascade information of a plurality of stages of networking units, wherein cascade information of each of the plurality of stages of networking units comprises optical port information and identification information of the each of the plurality of stages of networking units;

determining a data allocation link according to the actual networking topology; and allocating data according to the data allocation link;

wherein before determining the data allocation link according to the actual networking topology, the method further comprises:

comparing the actual networking topology with a preset networking topology to determine whether the actual networking topology is the same as the preset networking topology; and in response to a determination result that the actual networking topology is different from the preset networking topology, determining the data allocation link according to the actual networking topology, and allocating data according to the data allocation link determined according to the actual networking topology.

10. The method according to claim 9, in the absence of cascade information of a networking unit in any stage, generating an alarm signal.

11. The method according to claim 9, in the absence of cascade information of a networking unit in any stage, generating an alarm signal.

12. A data allocation controller, comprising:

a memory storing an executable program; and at least one processor, wherein when the at least one processor calls the executable program, the at least one processor is capable of performing the data allocation method according to claim 9.

13. A non-transitory computer-readable storage medium storing an executable program, wherein the executable program, when executed, is capable of implementing the data allocation method according to claim 9.

* * * * *